UNITED STATES PATENT OFFICE.

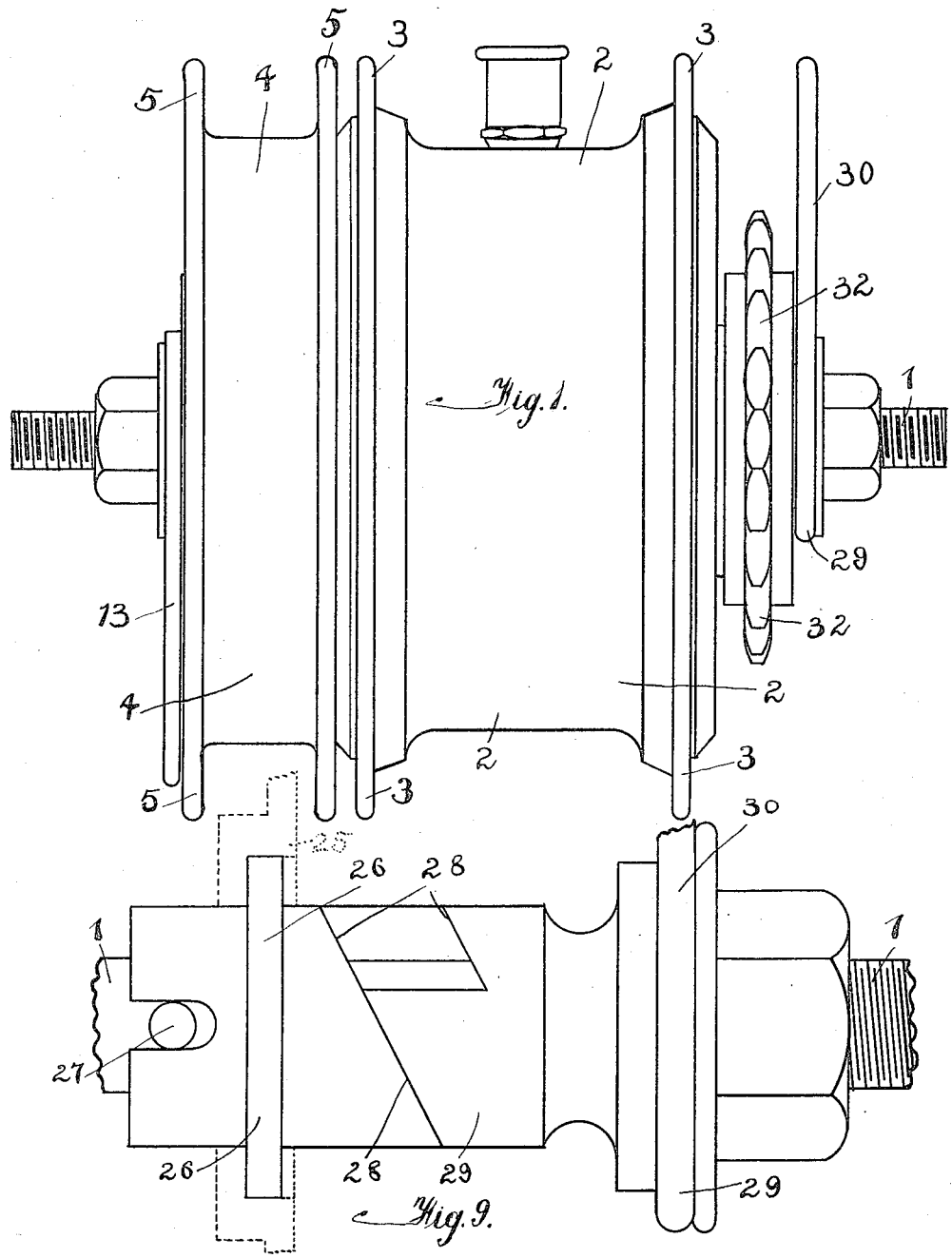

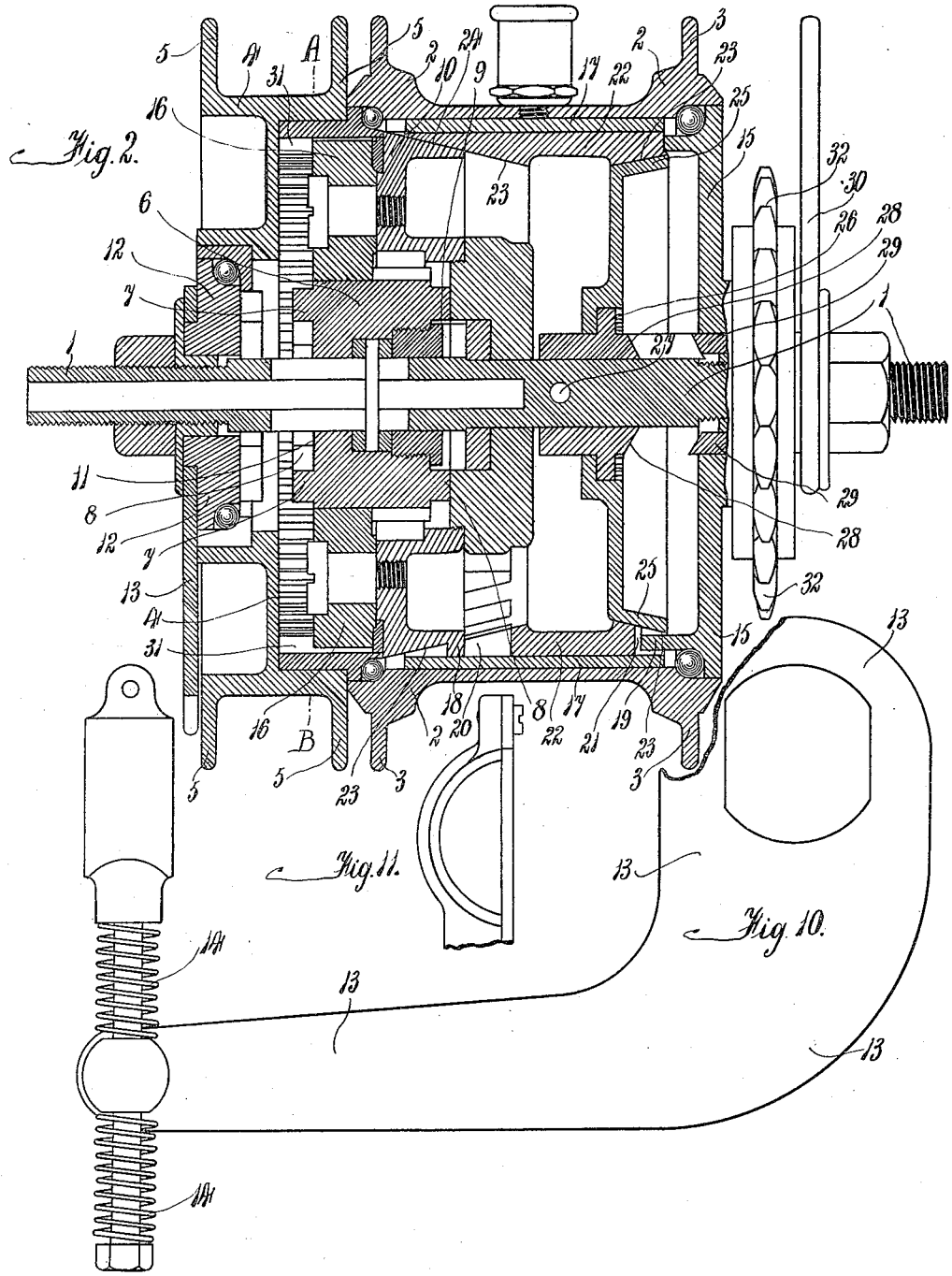

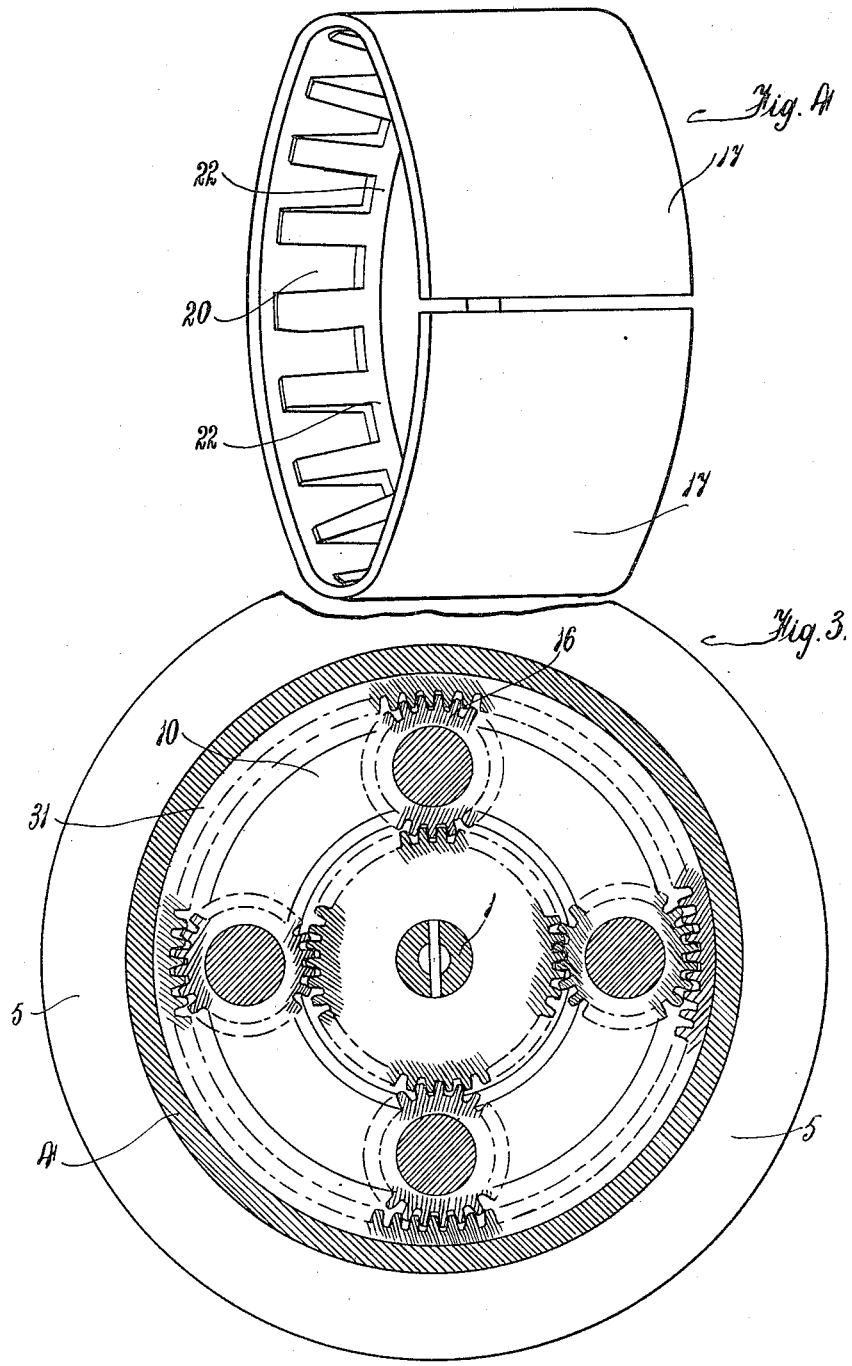

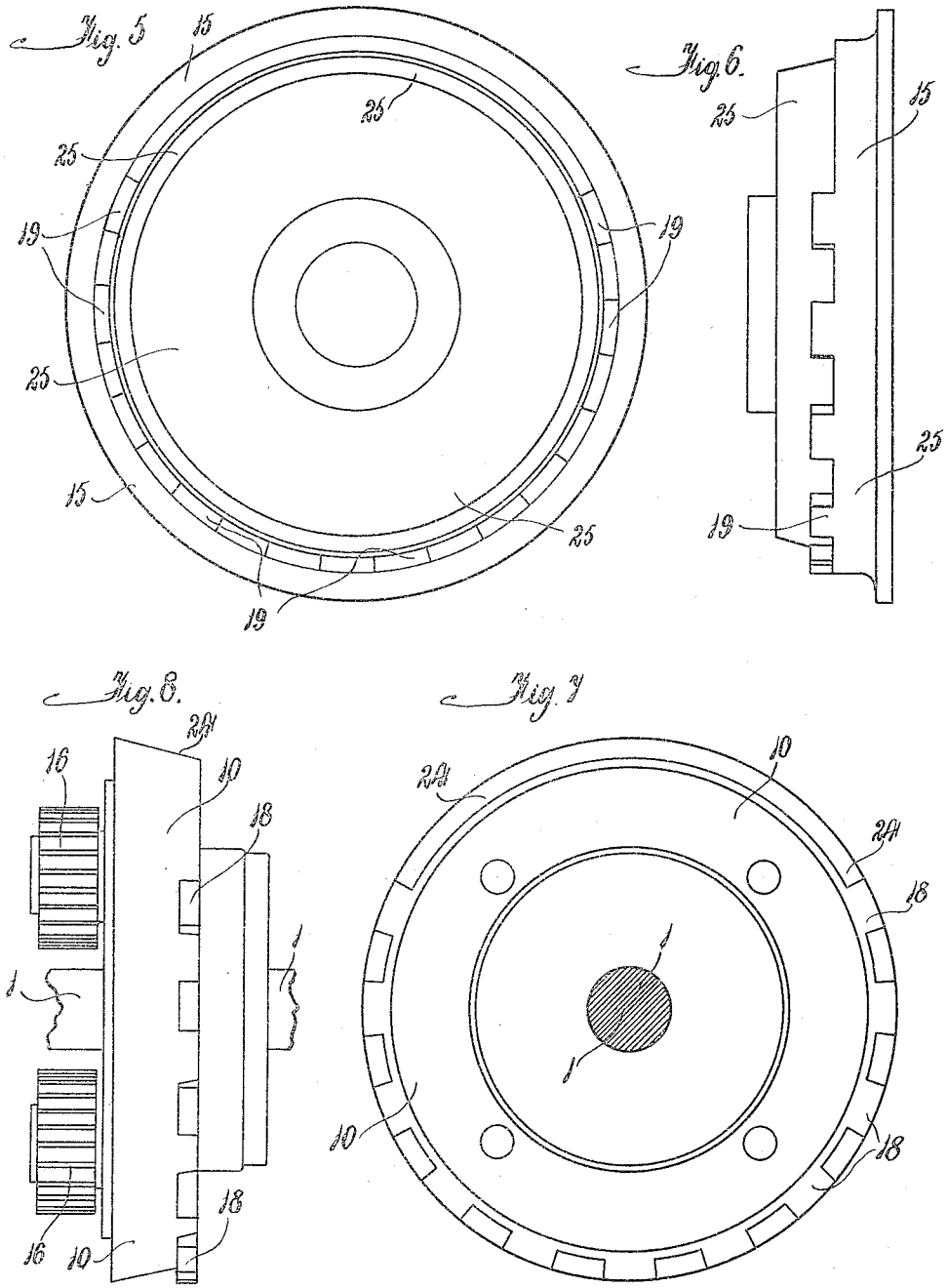

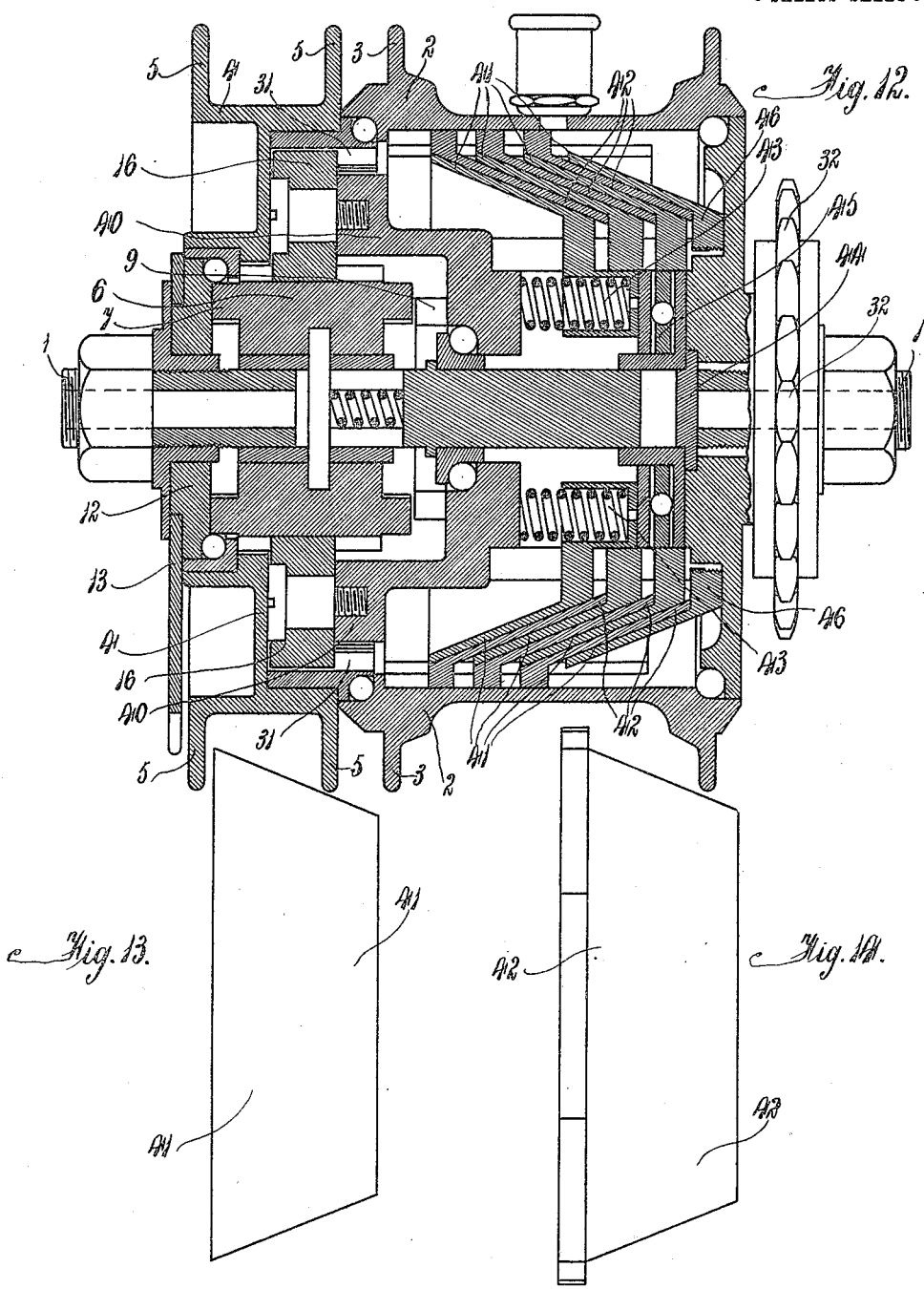

WILLIAM RICHARD BLAXLEY AND WILLIAM CHARLES PINSON, OF LEICESTER, ENGLAND.

VARIABLE-SPEED AND FREE-ENGINE GEARING.

1,070,004. Specification of Letters Patent. Patented Aug. 12, 1913.

Application filed September 28, 1912. Serial No. 722,951.

*To all whom it may concern:*

Be it known that we, WILLIAM RICHARD BLAXLEY and WILLIAM CHARLES PINSON, subjects of the King of Great Britain, residing at Thornton Lane, Leicester, in the county of Leicester, England, have invented a new and useful Variable-Speed and Free-Engine Gearing; and we do hereby declare the following to be a full, clear, and exact description of the same.

Our invention comprises improvements in variable speed gearing for motor cycles and motor vehicles, and refers to that class of such in which an epicyclic train of gears is located in the wheel hub and in which the planet pinions are carried by the driven member, two speeds being obtained by locking the "sun wheel" and the planet pinions together so that these wheels rotate solidly with the internal gear, or by securing the "sun wheel" rigidly against rotation, so that as the planet pinions are rotated about same their individual rotation will give a decreased movement and decreased speed to the planet pinion carrier member which is connected to the driven road wheel; the object of our said invention being to provide an improved and simpler two speed gear of the specified type, which may be entirely disconnected from the road wheel to allow the engine of the machine to be started and driven independently of the road wheel.

Referring to the drawings:—Figure 1 is an elevation of the hub complete. Fig. 2 is a longitudinal section through same showing the "sun wheel" arranged to rotate with the driven member *i. e.* in the high speed position. Fig. 3 is a section at A—B in Fig. 2. Fig. 4 shows the cylindrical clutch in perspective. Fig. 5 is a face view of the movable cone employed to expand the cylindrical clutch, together with the surrounding toothed disk. Fig. 6 shows same in side elevation. Fig. 7 is a face view and Fig. 8 is a side elevation of the second or fixed cone which also carries a series of teeth and the planet wheels. Fig. 9 illustrates the cam clutch employed for moving the cone to expand the cylindrical clutch. Fig. 10 shows the means whereby the clutch is locked to the framework of the machine. Fig. 11 is a detail end view. Fig. 12 is a sectional view of a modified form of our hub. Figs. 13 and 14 illustrate two of the clutch disks removed.

In carrying our invention into practice as illustrated upon the accompanying drawings, applied to a motor cycle the hub is formed in two parts each rotatable about the same spindle 1, the larger part 2 having the usual flanges 3 for carrying the spokes which connect said parts to the road rim, and in this part of the hub is located the clutch. The second part 4 of the hub is narrower and has suitable flanges 5 whereby it carries the belt rim, or it may have sprocket teeth when the machine is chain driven; and within this portion of the hub is rigidly secured the internal gear 31.

The "sun wheel" 6 is movable endwise along the spindle and has on each of its faces a plurality of notches 7 or dog teeth 8 or equivalent means whereby it may engage projections 9 carried by the planet pinion carrying disk 10 when the "sun wheel" is in one position, or engage similar projections 11 on a plate 12 anchored to the framework when in the other extreme position, while when the pinion is in intermediate position it may give "free engine" *i. e.* the engine is disconnected from the road wheel. The plate carrying the fixed projections is preferably anchored to the framework of the bicycle by means of the usual crank arm 13 which is secured to the framework through the medium of two springs 14 one on each side, one of which absorbs any sudden shock which may be thrown upon the road wheel when the gear is operated, the second spring absorbing the reaction.

At each end of the main portion of the hub are disks 10 and 15 one of which 10 carries the planet pinions 16, while between these disks is a cylinder 17 split longitudinally and so arranged that when expanded the cylinder will engage the interior of the hub and make a driving connection, while when in its normal contracted condition it is disengaged from same. These disks 10, 15 are provided with a series of projections 18 and 19 respectively extending partly or entirely around their periphery which engage corresponding recesses 20 and 21 in the ends of the split cylinder in such manner that the two disks and the cylinder are always caused to rotate together, though permitted a limited endwise movement between them when the cylinder is being expanded. The cylinder is preferably made in two parts a gun metal covering and a steel liner 22.

Each end of the cylinder is internally coned as 23, one end engaging a corresponding coned portion 24 of the planet pinion carrying disk 10, while the other end is engaged by an angularly moving cone 25 so arranged that when this cone is moved the cylinder is forced between the two cones and expanded into engagement with the interior of the wheel hub. The endwise movement of the cone may be effected by any suitable means, a convenient method being to rotatably mount the cone around a carrying center 26 which is so keyed as at 27 to the spindle that it cannot rotate, but is movable laterally. The outer end of this carrying center is provided with inclines or cam surfaces 28 which are engaged by corresponding surfaces on an actuating member 29 which is held against angular movement but adapted to be rotated by a suitable crank arm 30 controlled by the operating mechanism whereby the gearing may be connected to or disengaged from the road wheel.

The angular movement of the "sun wheel" 6 is effected by any suitable or usual mechanism not shown passing through the hollow spindle, and obviously when this wheel is in engagement with the planet pinion carrying disk 10 the internal gear 31, planet pinions 16, and "sun wheel" 6 will rotate solidly together, the planet pinion carrying disk being thus driven at the same rate as the internal gear which is connected to that portion of the hub which carries the belt rim; this being the normal driving relations.

When the "sun wheel" is moved endwise into engagement with the fixed projections 11 it obviously cannot rotate, and as the planet pinions are then free to rotate about it when driven orbitally by the internal gear, the speed at which the planet pinion carrying disk is driven will thus be decreased to an extent depending upon the relative sizes of the gears. When the "sun wheel" is at an intermediate position it will be obvious that the engine will run without driving the road wheel.

The second disk 15 which is connected to the expanding cylinder carries a free wheel 32 operated by the usual pedals or by a starting handle, or the disk itself may be fitted with a starting handle. If the cylinder is contracted out of engagement with the wheel hub it will be obvious that when this disk is rotated the planet pinion carrying disk is rotated with it, thus driving the internal gear and pulley to rotate the engine which may be effected quite independently of the road wheel and when the road wheel is upon the ground, while after starting the engine it is only necessary to expand the clutch to cause the road wheel to be driven.

In the modified form of the invention shown by Figs. 12–14 a modified form of clutch is employed. The planet pinions 16 are carried by a cylindrical member 40 having similar projections 9 on its end which are engaged by the teeth 8 on the "sun wheel" 6. To this cylinder 40 are keyed a plurality, say four, tapered or conical disks or members 41 preferably made of gun metal; while disposed between or alternately with the disks 41 are other similarly formed disks 42 which are keyed to the interior of the hub 2; all these disks being tapered both internally and externally to mutually engage. Springs 43 act to press these tapered or conical disks into frictional engagement the conical formation presenting a considerable frictional surface and providing a very powerful grip; the locking of the two series of disks together obviously firmly locking the epicyclic gear to the hub and thus driving same. To release the clutch the springs are forced back by the plunger 44 and ball bearing disk 45 when the two series are free to relatively rotate, the plunger being moved endwise by any suitable means. The various disks are held in place by screwing the end member 46 onto the extremity of the cylinder 40.

What we claim then is:—

1. In variable speed and free engine mechanism for motor cycles and motor vehicles, the combination of a hub ring driven from the engine; an internal gear carried by said hub ring; a main hub; a spindle supporting the main hub and hub ring; a "sun" wheel carried by said spindle and movable along the same; a clutch for engaging the said main hub; a plurality of planet pinions carried by said clutch and engaging the internal gear and the "sun" wheel and thereby transmitting motion from the hub ring and internal gear to the clutch and main hub; means for shifting the "sun" wheel endwise and locking the same against rotation to cause the main hub to be driven at a reduced speed; and means for locking the "sun" wheel in engagement with the clutch and causing the main hub to be driven at the same speed as the hub ring.

2. In variable speed and free engine mechanism for motor cycles and motor vehicles, the combination of a hub ring driven from the engine; an internal gear carried by said hub ring; a main hub; a spindle supporting the main hub and the hub ring; a "sun" wheel carried by said spindle and movable along the same; a plurality of clutch members locked to the interior of the main hub; a plurality of planet pinions engaging said internal gear and said "sun" wheel; means for carrying said planet pinions; a plurality of clutch members locked to said planet pinion carrying means and disposed alternately with and between the clutch members connected to the hub;

means for pressing said clutch members together and thereby causing the main hub and the planet pinions to travel around together; means for shifting the "sun" wheel endwise and locking same against rotation to cause the main hub to be driven at a reduced speed; and means for locking the "sun" wheel in engagement with the planet carrier and causing the main hub to be driven at the same speed as the hub ring.

3. In variable speed and free engine mechanism for motor cycles and motor vehicles, the combination of a hub ring driven from the engine; an internal gear carried by said hub ring; a main hub; a spindle supporting the main hub and the hub ring; a "sun" wheel carried by said spindle and movable along the same; a plurality of clutch members tapered both internally and externally and keyed to the interior of the main hub; a plurality of planet pinions engaging said internal gear and said "sun" wheel; means for carrying said planet pinions; a second series of clutch members similarly tapered both internally and externally and keyed to said planet pinion carrying means, and disposed alternately with and between the clutch members keyed to the hub; means for pressing said clutch members together and thereby causing the main hub and the planet pinions to travel around together; means for shifting the "sun" wheel endwise and locking the same against rotation to cause the main hub to be driven at a reduced speed; and means for locking the "sun" wheel in engagement with the planet carrier and causing the main hub to be driven at the same speed as the hub ring.

4. In variable speed and free engine mechanism for motor cycles and motor vehicles, the combination of a hub ring driven from the engine; an internal gear carried by said hub ring; a main hub; a spindle supporting the main hub and hub ring; a "sun" wheel carried by said spindle and movable along the same; a plurality of clutch members tapered both internally and externally and keyed to the interior of the main hub; a plurality of planet pinions engaging said internal gear and said "sun" wheel; means for carrying said planet pinions; a second series of clutch members similarly tapered both internally and externally and keyed to said planet pinion carrying means, and disposed alternately with and between the clutch members keyed to the hub; spring actuated means for pressing said clutch members together and thereby causing the main hub and the planet pinions to rotate together; means for shifting the "sun" wheel endwise and locking the same against rotation to cause the main hub to be driven at a reduced speed; and means for locking the "sun" wheel in engagement with the planet carrier and causing the main hub to be driven at the same speed as the hub ring.

5. In variable speed and free engine mechanism for motor cycles and motor vehicles, the combination of a hub ring driven from the engine; a main hub; an epicyclic train of gears contained in said hub and arranged to drive the hub at different speeds; a plurality of clutch members tapered both internally and externally and keyed to the interior of the main hub; a second series of clutch members similarly tapered both internally and externally and connected to part of said epicyclic train of gears, rotated thereby, and disposed alternately with and between the clutch members keyed to the hub; and means for pressing said clutch members together and thereby causing the main hub and epicyclic train of gears to rotate together.

In testimony whereof, we have signed our names to this specification in the presence of two subscribing witnesses.

WILLIAM RICHARD BLAXLEY.
WILLIAM CHARLES PINSON.

Witnesses:
CHARLES STONESTER,
NORMAN S. BARLOW.

---

Copies of this patent may be obtained for five cents each, by addressing the "Commissioner of Patents, Washington, D. C."